United States Patent [19]

Armor et al.

[11] Patent Number: 5,086,033
[45] Date of Patent: Feb. 4, 1992

[54] USE OF HELIUM AND ARGON DILUENT GASES IN MODIFICATION OF CARBON MOLECULAR SIEVES

[75] Inventors: John N. Armor, Orefield; Thomas A. Braymer, Allentown; Thomas S. Farris, Bethlehem; Thomas R. Gaffney, Allentown, all of Pa.

[73] Assignee: Air Products and Chemicals, Inc., Allentown, Pa.

[21] Appl. No.: 638,477

[22] Filed: Jan. 3, 1991

Related U.S. Application Data

[63] Continuation-in-part of Ser. No. 575,474, Aug. 30, 1990.

[51] Int. Cl.$^5$ ............... C01B 31/00; C01B 31/10; B01J 20/20
[52] U.S. Cl. ............... 502/432; 55/74; 264/29.5; 423/449; 502/417; 502/438
[58] Field of Search ............... 502/432, 417, 438; 423/449; 264/29.5; 55/74

[56] References Cited

U.S. PATENT DOCUMENTS

| | | | |
|---|---|---|---|
| 3,801,513 | 4/1974 | Munzner et al. | 252/421 |
| 4,458,022 | 7/1984 | Ohsaki et al. | 502/42 |
| 4,685,940 | 8/1987 | Saffer et al. | 423/449 |
| 4,742,040 | 5/1988 | Ohsaki et al. | 502/417 |
| 4,880,765 | 11/1989 | Amorklauch et al. | 502/432 |

FOREIGN PATENT DOCUMENTS

49-37036 2/1974 Japan.
62-176908 4/1987 Japan.

OTHER PUBLICATIONS

K. Chihara et al., "Air Separation by Modified Molecular Sieving Carbon", Proc. Third Pacific Chem. Eng. Congress, vol. 1, p. 180 (1983).
S. I. Surinona, "Formation of the Borons Structure of Carbon Molecular Sieve from Caking Coals", Khim. Teord. Tap., (Moscow) (5), 86-90, (1988).

*Primary Examiner*—Paul E. Konopka
*Attorney, Agent, or Firm*—Mark L. Rodgers; William F. Marsh; James C. Simmons

[57] ABSTRACT

Carbon molecular sieves, useful in the separation of air into oxygen and nitrogen, are improved through modification of the micropores of the sieve by contact with the pyrolysis products of a carbon-containing compound in the gaseous state diluted with helium, with or without nitrogen as a part of the diluting gas. Volatile organic compounds, such as trimethylcyclohexane, are used with the diluent gas to narrow the micropore openings of a carbon molecular sieve and increase its kinetic selectivity for oxygen adsorption. Carbon dioxide and helium or argon in the diluent gas are used to open pores available to contacting gases.

10 Claims, 2 Drawing Sheets

USE OF HELIUM AND ARGON DILUENT GASES IN MODIFICATION OF CARBON MOLECULAR SIEVES

RELATED APPLICATIONS

This application is a continuation-in-part of application Ser. No. 575,474 filed Aug. 30, 1990.

FIELD OF INVENTION

This invention relates to a process for modifying carbon molecular sieves (CMS) by pyrolysis of volatile carbon-containing organic compounds in the presence of sieve material while using special diliuent gases including helium. In another aspect it relates to a process for opening pores in a CMS by oxidation with carbon dioxide diluted with helium or argon.

BACKGROUND

The modification of carbon molecular sieves (CMS) by prolysis of carbon-containing compounds in order to deposit carbon in the pores of the sieve is well known. Nitrogen has been the carrier gas used in many such processes. For example in U.S. Pat. No. 3,801,513, Munzner, et al., (1974) there is a description of obtaining CMS for oxygen separation by treating coke having volatile components of up to 5% with a carbonaceous substance which splits off carbon at 600°-900° C., thereby narrowing the pores present in the coke. It is stated that the average pore size of the adsorbent must be below 3 angstroms (Van der Waals diameter) to effect oxygen separation from nitrogen. The average pore diameter can be adjusted by changing the intensity of the treatment. Coconut shell coke is a suitable starting material, among others. A preference is stated for a particle size in the range of 0.1 to 20 millimeters and suitable carbonaceous substances which can be used in the treatment include benzene, ethylene, ethane, hexane, cyclohexane, methanol abnd the like. Nitrogen is used in Example 1 both as a carrier gas for benzene and a cooling gas.

Chihara, et al., Proc. Third Pacific Chem. Eng. Congress, Volume 1 (1983) discloses that CMS which is a pelletized granular activated carbon can be treated by thermally decomposing benzene in a fluidized bed of the CMS to deposit carbon thereon and thereby adjust the overall mass transfer coefficients of oxygen and nitrogen in the CMS. Nitrogen is disclosed as a carrier gas for the benzene.

U.S. Pat. No. 4,458,022, Ohsaki, et al., (1984) refers to several prior art processes for narrowing the micropores of active carbon by precipitating soot in the micropores and describes a method said to provide improved selectivity for separating nitrogen from air. The method involves using coconut shell charcoal and coal tar binder, acid washing, adding coal tar and heating to 950°-1000° C. for 10-60 minutes. The coal tar is said to penetrate into the surface of the active carbon and decompose to grow carbon crystallite on the inner surface of the micropore. It is stated that for PSA separation of nitrogen and oxygen, the oxygen adsorption capacity should be more than 5 milliliters (STP) per gram and the selectivity more than 22 to 23. Nitrogen is used as an inert gas in the heating and cooling phases of this treatment.

Surinova, Khim. Tevrd. Top., Moscow (5) 86-90 (1988) describes obtaining carbon molecular sieves for concentration of nitrogen from air by carbonizing gaseous coals using benzene vapor and inert gas. The inert gas is not identified. In other references such as Japanese Patent Application No. Sho 62-176908 (1987) a method for making carbon molecular sieves suitable for separating oxygen and nitrogen is disclosed involving the use of carbon from coconut shells and coal tar or coal tar pitch binder to form particles which are dry distilled at 600°-900° C., washed with mineral acid and water and dried, and then impregnated with hydrocarbon and heat treated for 10-60 minutes at 600°-900° C. in inert gas, for example nitrogen. In this process the inert gas is not used as a carrier or diluent of the modifying hydrocarbon which instead is impregnated into the carbon base material prior to the heat treatment. It is said that this procedure is superior to the use of hydrocarbons, such as benzene, pyrolyzed in the gas phase so that carbon produced adheres to the carbonaceous surface.

A similar but earlier disclosure appears in Japanese Publication No. Sho 49-37036 (1974) which describes making a carbon molecular sieve by condensing or polymerizing a phenol resin or furan resin so that the resin is adsorbed on the carbon adsorbent and thereafter carbonizing the product by heating. Mixtures of the resins can also be used. The resin forming material is dissolved in water, methanol, benzene or creosote oil and the solution is used to impregnate the carbon adsorbent. Carbonizing is then carried out at 400°-1000° C. in an inert gas and a number of suitable inert gases are suggested such as nitrogen, hydrogen, helium, carbon dioxide, carbon monoxide, and sulfur dioxide.

There is nothing in the prior art which suggest that, other than being inert, the nature of the diluent gas which is used with a gaseous carbon-containing compound in a pyrolysis to modify a carbon molecular sieve has any significance. Consequently, it is understandable that the prior work has consistently used nitrogen, the cheapest of diluent gases, for such service.

SUMMARY OF THE INVENTION

We have found that in the modification of a carbon molecular sieve in order to alter its gas separation characteristics by contacting the sieve under pyrolysis conditions with a volatile carbon-containing organic compound, the selection of a diluent gas makes a material difference in the results obtained. More particularly, we have discovered that the use of helium, which normally would be considered an inert gas, produces results which carry distinct advantages over the use of nitrogen in this service under the same pyrolysis conditions. Under otherwise equivalent conditions with a pyrolysis time and temperature which is sufficient to affect the gas separation characteristics of the carbon molecular sieve, the use of helium with or without nitrogen improves the selectivity of the CMS when the modification employs a volatile organic compound which is pyrolyzed to deposit carbon and thereby narrow the openings of the micropores of the CMS.

We have also discovered that the use of helium or argon alone or in a mixture with nitrogen is superior to the use of nitrogen alone as a diluent gas for carbon dioxide which is pyrolyzed over the sieve in order to widen pores or open up new porosity. The use of argon or helium or a mixture of these gases with nitrogen as a diluent for the carbon dioxide has been found to be superior to the use of nitrogen alone in opening porosity and producing fast, unselective carbons.

IN THE DRAWINGS

DETAILED DESCRIPTION OF THE INVENTION

Figure 1:
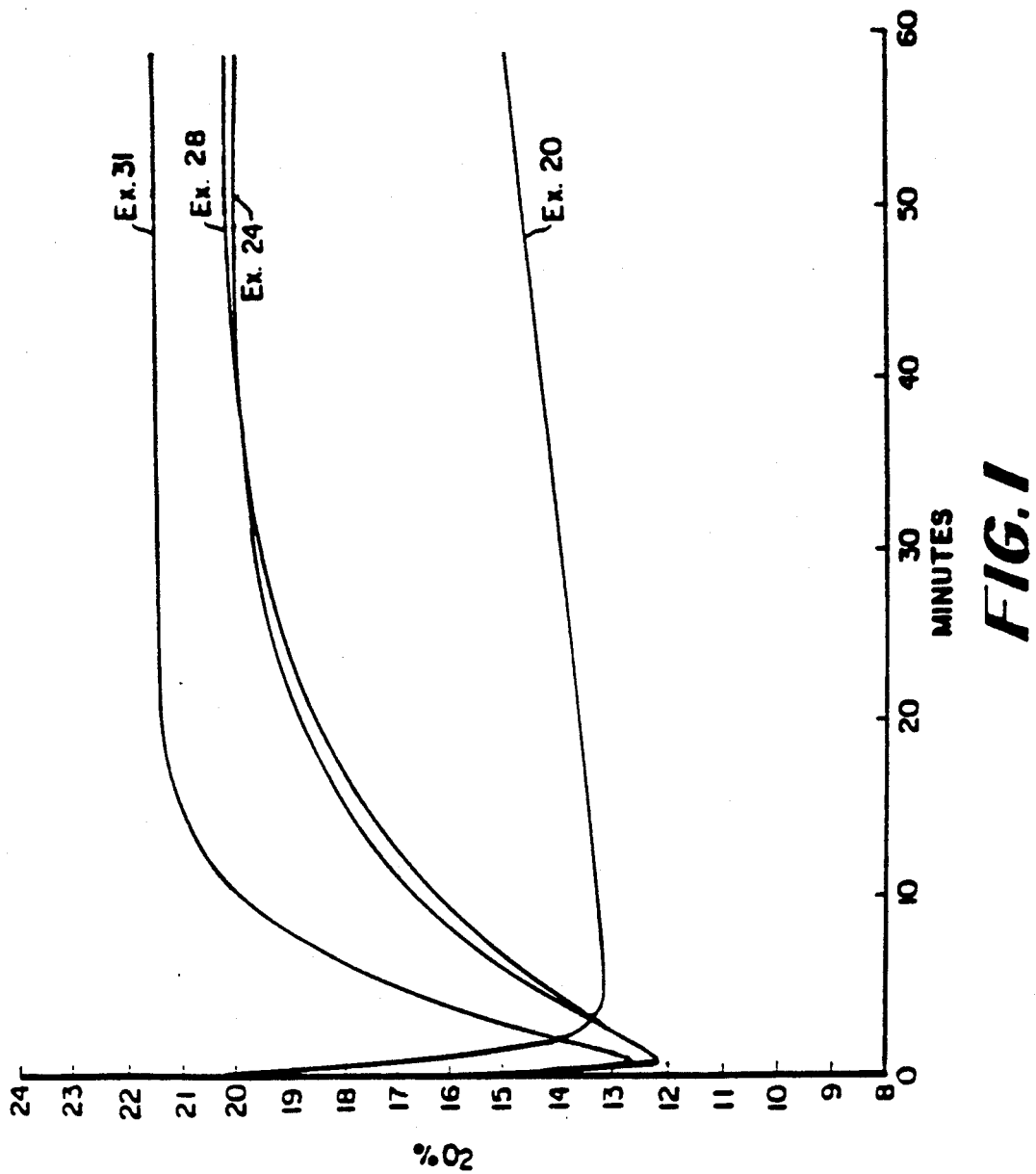
FIG. 1 is a plot of data showing oxygen adsorption with time on carbon molecular sieve treated using various carrier gases.

Air separation can be effected over carbon molecular sieve adsorbents which separate oxygen from air on a kinetic basis, adsorbing the smaller oxygen molecules rapidly relative to the slightly larger nitrogen molecules. In order to effect separation, the adsorbent must have pore openings of about the molecular diameter of the larger gas in the mixture (nitrogen in air). Some chemisorption of oxygen along the pores is believed to contribute to the pore size selectivity of oxygen over nitrogen. Control of pore size with sub-angstrom precision allows for rapid adsorption of the smaller component and slower diffusion of the larger component, resulting in high kinetic selectivity. The ability to control, both consistently and precisely, the size of the pore openings on a CMS, to tenths of an angstrom in the case of air separation, is a major challenge for the synthesis of CMS adsorbents. Improved CMS adsorbents are needed to reduce the cost of air separation by PSA systems.

As pointed out in the discussion of the prior art, kinetic selectivity can be imparted to microporous carbons by pyrolyzing a reagent that will leave carbonaceus residue on the carbon substrate. We have found, using plug gauge studies, that pore properties of the carbon substrate are critically important to the success of the treatment in imparting oxygen selectivity to the product. We have found that the carbon source must be comprised of pores of about 4 angstoms in size in order for prior art treatments to impart facile kinetic oxygen selectivity over nitrogen. While there has been recognition of the usefulness of using a hydrocarbon larger than the pore size of the carbon to form a surface barrier by hydrocarbon pyrolysis, there has been no appreciation that the carrier gas, e.g. nitrogen, which had been thought to be chemically inert, could have an impact on the preparation of CMS materials.

As pointed out in our pending appliction Ser. No. 575,474, filed Aug. 30, 1990, kinetically oxygen-selective adsorbents can be prepared from a variety of porous carbons by forming a carbonaceous surface layer on the carbon support in a particulary manner. Selective pyrolysis of a molecule that is too large to penetrate the micropores of the carbon support produces microporous domains of carbon which have high kinetic selectivity for oxygen relative to nitrogen owing to the deposition of carbonaceous residue at the pore mouth openings. The invention disclosed in the above-referenced application involves a two step method of promoting surface barrier formation via pyrolysis of a volatile carbon-containing organic compound, preferably a hydrocarbon, by first using a compound that is too large to penetrate the small micropores of the carbon support and subsequently using a smaller organic compound that is cracked on the intermediate product until the remaining micropores are narrowed to about 4.0 angstoms. As disclosed in that application, helium can be used as the carrier gas in either the single step or two step pyrolysis treatment. In the two step process, by varying pyrolysis parameters (e.g. upper temperature limit or hold time) one can use nitrogen in one of the steps and helium in the other.

According to our present invention the identity of the diluent gas used in the transport of the carbon-containing materail to the CMS is important in producing a desirable product. Quite unexpectedly, the carrier gas, previously thought to be inert, plays a major role in the quality of the CMS produced and selection of the correct carrier gas or gases allows an extra measure of control over pore size of the CMS product. Moreover, we have found that the use of helium or helium/nitrogen blends as the carrier gas provides a greater option of treatment times and enables more control of the process for fine adjustments in the carbon deposition.

All molecular sizes refer to those typically described as minimum Van der Waals diameters. Here oxygen is 2.8 angstroms in width, while nitrogen is 3.0 angstroms. This contrasts to the Leonard Jones sigma value where the width of the oxygen is 3.46 angstoms and nitrogen is 3.64 angstoms (Ref: D. W. Breck, "Zeolite Molecular Sieves", *Wiley-Interscience*, New York, N.Y., page 636). In principle, however, the pores must be somewhat larger than the minimum critical dimensions of the diffusing molecule due to additional energy barriers (e.g., interaction of the $\rho$ electron density, etc., with the walls of the slit-shaped pores; Ref: M. B. Rao, et al., *Langmuir*, 1 137 (1985)). Thus, we observe that pores for distinguishing oxygen from nitrogen should be about 3.8, but less than 4.3, angstoms.

The starting molecular sieve support can be any CMS having micropores, which are generally considered to have a size less than 20 angstroms, in which a majority of the micropores have sizes which are preferably less than 8 angstroms but greater than 3.4 angstroms. The invention is especially valuable in modification of CMS with micropores which have a size of at least 4.5 angstroms, since by using a starting CMS support of this character a much less expensive product can be obtained. Coconut shell derived carbon is one suitable source for supports which can be used to advantage in this invention.

The treating compound which supplies the carbon for narrowing the pore diameter of the support can be any volatile carbon-containing organic molecule including hydrocarbons and compounds with hetero atoms, such as oxygen, nitrogen, sulfur, silicon and the like, provided that the compound can decompose cleanly without forming pore-plugging materials. Examples of compounds which are useful include 1,3,5-trimethylcyclohexane, 1,2,4-trimethylcyclohexane, 1,1-dimethylcylohexane, cineole, isobutylene, isobutane, 2,2,3-trimethylbutane, isoctane, cyclohexane, and similar compounds, preferably hydrocarbons.

The conditions of pyrolysis generally include temperatures in the range of 500°–900° C., preferably about 550°–900° C. and pressures under which the treating carbon-containing compound is gaseous, preferably about $P_{HC}=0.2$, $P_{TOTAL}=1$ atm. The flow rates and concentration of the treating material as well as temperatures can be adjusted along with the duration of the treating step in order to modify the effects desired. In general, a lower flow rate produces more severe conditions as do higher concentrations of the carbon-containing compound, longer times and higher temperatures. To take advantage of the use of the diluent gases of helium or argon, the duration of the pyrolysis treatment must be sufficient to affect the characteristics of the CMS. While these factors are interdependent and can be balanced against each other, results are also affected by the amount of carbon-containing compound, the size of the reactor, its configuration, preheating and volatility of the organic compound. If the organic compound is normally a liquid, it can be readily vaporized in the diluent gas which serves as a carrier for the organic compound to the treatment zone. Gaseous treating compounds can be mixed with the diluent gases over a broad range of proportions. As an example, a mixture containing about 20 vol. % of the carbon-containing compound in the diluent gas is suitable but normally the volume percent of the carbon-containing compound in the total mixture with the diluent gas is about 0.5 to 25 percent, preferably 0.9 TO 20 percent, and usually is less than 10 percent.

When using a mixture of helium and nitrogen as the diluent gas, the helium content of the diluent should be at least 15 volume percent, and preferably at least 25 volume percent, to obtain both good selectivity and high capacity in the product CMS for separating oxygen from nitrogen.

In order to illustrate our invention more fully, the following examples are presented which should not be construed to limit our invention unduly.

In these examples evaluation of the CMS products was made with a Circulating Adsorption Unit (CAU). The Circulating Adsorption Unit (CAU) had a Servomex oxygen monitor, 570A with 311 cell and bypass plumbing to allow 0.5-8 liters per minute flow. This was connected to a Cole Parmer pump, (N-7088-48) with a diaphragm head. The pump was modified with a variable speed controller and high torque motor, (G. K. Heller, GT-21) which allowed the circulation rate to be varied at varying pressures (0.2-1.0 atm.) while maintaining consistent pump speed at any given rate and pressure. The pump fed a glass cell adsorption unit equipped with a thermocouple. The glass cell, in turn, was connected to the oxygen monitor through an MKS barometer, pressure transducer 127AA001000A, power supply PDR-C-1C.

The responce time of the $O_2$ monitor was 7 seconds to 90% of scale, and the pump was sized to allow circulation rates of 150-7000 $cm^3$/min. A compression wave does result from the operation of the single diaphragm pump, therefore it is important to record data at a rate which is fast relative to the pump rate. This was accomplished using a MACSYM computer, Model 120, which was programmed to collect data with adjustable frequency throughout the adsorption run.

The CAU pressure transient is the summation of pressure uptake transients for the individual gas components. Using equations for gravimetric uptake, equations were derived which describe the pressure and % $O_2$ traces measures on the CAU. System pressure as a function of time is given by the expression:

$$P = P_i - P_{O2}(1 - e^{-Lt}) - P_{N2}(1 - e^{-mt}) \quad \text{(Equation 1)}$$

where;
$P_i$ = initial system pressure
$P_{O2}$ = oxygen pressure sorbed at equilibrium
$P_{N2}$ = nitrogen pressure sorbed at equilibrium
L and m are mass transfer coefficients for $O_2$ and $N_2$ respectively The % $O_2$ measured versus time for air (21% $O_2$) is given by the expression:

$$\%O_2 = 100[0.21P_i - P_{O2}(1 - e^{-Lt})]/[P_i - P_{O2}(1 - e^{-Lt}) - P_{N2}(1 - e^{-mt})] \quad \text{(Equation 2)}$$

Note that $P_{O2}$, $P_{N2}$, and $P_i$ are measured at t=0 and t=infinity, and can be obtained from the CAU data. The mass transfer coefficients can therefore be obtained by fitting equation 1 to the pressure data or by fitting equation 2 to the % $O_2$ data. The kinetic selectivity is the ratio of the mass transfer coefficients, L/m.

The amount of $O_2$ sorbed short times (1 min) exceeds the equilibrium amount of $O_2$ sorbed, and gradually decays back to the equilibrium value as $N_2$ slowly diffuses into the micropores and displaces oxygen. This behavior is not accounted for by eqs. 1 and 2, and they predict a working selectivity that is higher than the actual value. The observed "overshoot" of $O_2$ adsorption above the equilibrium value, which occurs in the kinetic region of the experiment is a competitive adsorption effect. At short times, when $O_2$ has largely saturated the adsorbent but $N_2$ has yet to permeate the adsorbent and approach its adsorptive capacity, $O_2$ will cover adsorption sites over the entire range of energetics. As $N_2$ permeates the adsorbent, it displaces much of the $O_2$ that was sorbed. This occurs owing to the higher heat of adsorption of $N_2$ over $O_2$ on CMS carbons at low pressure ($\leq$ 1 atm), and results in the lowest energy state of the adsorbate/adsorbent system at equilibrium. The net effect is that the apparent equilibrium constant for $O_2$ adsorption is higher in a non-competitive experiment than when $O_2$ competes with $N_2$ for sites (which occurs as equilibrium is approached).

An additional term can be added to eqs. 1 and 2 to accound for this behavior. Now:

$$P = P_i - (P_{O2} + P_{ex}e^{-mt})(1 - e^{-Lt}) - P_{N2}(1 - e^{-mt}) \quad \text{(Equation 3)}$$

$$\%O_2 = 100[0.21P_i - (P_{O2} + P_{ex}e^{-mt})(1 - e^{-Lt})]/[i\ P_i - (P_{O2} + P_{ex}e^{-mt})(1 - e^{Lt}) - P_{N2}(1 - e^{-mt})] \quad \text{(Equation 4)}$$

where $P_{ex}$ is the pressure of $O_2$ sorbed at short time which exceeds the equilibrium pressure of oxygen sorbed. When this additional term is added an excellent fit is obtained, and the selectivity value is in excellent agreement with values determined gravimetrically and volumetrically.

EXAMPLE 1-19

A 5A carbon molecular sieve (CST-51) was treated by pyrolysis of 1,2,4-trimethylcyclohexane at 675° C., with a space velocity of 1.0 reactor volume per minute. Various diluent gases were used as shown in Table 1. Operating at a fixed set of conditions, the only parameters changed from one example to the other were the composition of the diluent gas and the time of exposure of the CMS to the treating hydrocarbon.

A Lindbergh model 55347 3-zone furnace was used with a 2.5 liter quartz reactor rotated at 6 rpm is hoizontal plane. The carrier gas and hydrocarbon was delivered through a 316 SS tube to the base of the reactor tube and the gas was passed over the carbon bed and to the exit. The pump was an Isco syringe pump. In a typical procedure, 250 grams of carbon were charged into the quartz reactor and air was purged from the system using the diluent gas, either helium, nitrogen or argon, such that the volume of the reactor was purged every minute. After fifteen minutes, while maintaining this purge, the reactor was rotated at about 6 rpm and brought to 675° C. at a rate of 10° C. per minute. When 675° C. was attained, 1,2,4-trimethylcyclohexane was added to the diluent gas at 10 cc's per hour and vaporized by adding the liquid to a packed bed of stainless steel bearings at 120° C. This produced a hydrocarbon concentration in the treating gas of about 0.9 vol. %. Coking times of 2 to 5 hours were employed. The carbon was cooled to room temperature while a diluent purge without the TMC was maintained.

The CMS of each example was then tested in a CAU and Table 1 gives the initial and final pressures of these tests, the minimum oxygen percentage reached during the separation produre, the time required to reach this minimum level of oxygen and the mass transfer coefficients for oxygen (L) and nitrogen (m). The ratio of these values L/m gives a selectivity for air separation. The percent of oxygen at the minimum level is a measure of the ability of the CMS to sorb oxygen at a rate indicated by the time. The inititat pressure indicates the degree of pore restriction of the sieve since, for an oxygen selective CMS, the initial pressure drop to between about 590 to 605 torr represents filling of dead volume. The final pressure provides a qualitative measure of the capacity of the CMS whether it is selective or not.

Under the conditions employed and reported in Table 1, the use of nitrogen as the diluent gas for either 2.5 or 5 hours did not produce a suitable CMS for oxygen separation. Although Example 2 which used nitrogen for 5 hours treatment did show separation activity, the CMS lacked capacity as indicated by the high final pressure and the long time (35 minutes) required to reach the minimum oxygen level. On the other hand Examples 3–8 in which helium was used at treatment times from 2.5 to 3 hours produced a CMS which has good selectivity for oxygen as well as good capacity. These examples show particularly high values (greater than 3) for L which indicate a good mass transfer rate for the oxygen. This value in many cases is more important than the selectivity value which is the ratio of L to m although preferred values for selectivity should be greater than 20. Examples 9 and 10 show the use of helium for a 5 hour treatment. The CMS appear to be over treated and severely pore blocked because the separation time was quite slow. Under these conditions using helium as the diluent gas, it would be desirable to keep the treatment time to less than 5 hours.

Examples 11–14 show the use of argon as the treatment gas for periods of 2.5, 3.3 and 5 hours. The CMS of Example 11 was insufficiently restricted in its microporosity. The CMS of Example 9, however, with a treatment time of 3.3 hours, evidenced more restricted porosity with about the same capacity. Argon does not offer the flexibility of treatment afforded by the use of helium in the diluent gas.

Examples 15–17 show the use of blends of helium and nitrogen which alters the performance of the CMS products. Carbons produced at cracking times of 2.5 hours using helium/nitrogen blends of 50 and 75% helium resemble carbons modified in nitrogen alone. However, a 5 hour cracking time with a 50/50 blend of helium and nitrogen produced a carbon (Example 16) having adsorption characteristics faster than that produced at a 5 hour treatment time with either nitrogen or helium alone, even though this material, because of pore blocking, would not be attractive for air separation by pressure swing adsorption. This result is surprising, however, in view of the results obtained with nitrogen and helium alone. Although the blends did not impart selectivity at the short cracking times of 2.5 hours under these conditions, the result of the 5 hour cracking test suggests that a diluent blend of nitrogen and helium has a synergistic effect on the cracking process.

Although argon is shown by the data of Table 1 to be a less effective diluent than helium for modifying the 5A-CMS with trimethylcyclohexane, it is as effective as nitrogen. An exposure of 2.5 hours to the TMC with argon as diluent imparted essentially no selectivity (Example 11). By extending the exposure time to 3.3 hours, the oxygen selectivity was improved with good capacity as shown by Example 12, but the $N_2$ rate (m) was high. The use of nitrogen in Example 1 for 2.5 hours did not change the oxygen adsorption characteristics of the 5A-CMS and although, as shown by Example 2, a longer cracking time of 5 hours does impart some selectivity, as indicated by the minimum oxygen level, the carbon was slow, pore blocked, and had lost capacity compared to the product of the shorter treating period.

Examples 18 and 19 show that blends of argon and nitrogen do not evidence the same synergistic behavior as the blends of helium and nitrogen. The CMS of Example 18 was non-selective and that of Example 19 had a shorter time to the minimum oxygen level than Example 2 using nitrogen, but longer than Examples 13 and 14 using pure argon.

TABLE 1

| Example No. | Treating: Diluent Gas | Time at Temp. (hr) | Testing: (CAU) Initial Pressure (torr) | Final Pressure (torr) | Minimum % $O_2$ | Time to Minimum (min.) | L | m | Selectivity L/m | Comments |
|---|---|---|---|---|---|---|---|---|---|---|
| 1 | $N_2$ | 2.5 | 400 | 270 | 21 | 0 | N.C.** | N.C. | — | non-selective |
| 2 | $N_2$ | 5.0 | 590 | 560 | 15 | 35 | N.C. | N.C. | — | slow, lacked capacity; pore blocked |
| 3 | He | 2.5 | 534 | 280 | 13.5 | 0.4 | 9.2 | 1.5 | 6.1 | selective, good capacity, $N_2$ rate high |
| 4 | He | 2.75 | 552 | 270 | 12.9 | 0.3 | 11.5 | 0.9 | 13 | selective, good capacity |
| 5 | He | 2.75 | 581 | 285 | 14.1 | 0.3 | 10.1 | 0.75 | 13 | selective, good capacity |
| 6 | He | 2.83 | 588 | 284 | 13.1 | 0.4 | 10.0 | 0.34 | 29 | selective, good capacity |
| 7 | He | 2.90 | 594 | 285 | 12.9 | 0.4 | 9.4 | 0.33 | 28 | selective, good capacity |
| 8 | He | 3.0 | 591 | 285 | 12.5 | 0.5 | 9.4 | 0.17 | 55 | good sel., good cap. good $N_2$ rate |

TABLE 1-continued

| Example No. | Treating:* Diluent Gas | Time at Temp. (hr) | Testing: (CAU) Initial Pressure (torr) | Final Pressure (torr) | Minimum % O$_2$ | Time to Minimum (min.) | L | m | Selectivity L/m | Comments |
| --- | --- | --- | --- | --- | --- | --- | --- | --- | --- | --- |
| 9 | He | 5.0 | 609 | 495 | 13.9 | 35 | N.C. | N.C. | — | slow, pore blocked |
| 10 | He | 5.0 | 616 | 495 | 12.8 | 34 | N.C. | N.C. | — | slow, pore blocked |
| 11 | Ar | 2.5 | 379 | 273 | 19 | 0.3 | N.C. | N.C. | — | non-selective |
| 12 | Ar | 3.3 | 531 | 270 | 15.3 | 0.3 | 9.5 | 1.5 | 6.3 | selective, good capacity, N$_2$ rate high |
| 13 | Ar | 5.0 | 589 | 340 | 13.2 | 2.2 | 2.2 | 0.03 | 73 | pore blocked, rates slow |
| 14 | Ar | 5.0 | 604 | 332 | 13.0 | 2.3 | 2.3 | 0.04 | 58 | pore blocked, rates slow |
| 15 | He:N$_2$ 50:50 | 2.5 | 465 | 276 | 21 | 0 | N.C. | N.C. | — | non-selective |
| 16 | He:N$_2$ 50:50 | 5 | 603 | 414 | 13.1 | 8.7 | 0.55 | 0.006 | 92 | time to min. shorter vs. pure gas but pore blocked |
| 17 | He:N$_2$ 75:25 | 2.5 | 497 | 286 | 21 | 0 | N.C. | N.C. | — | non-selective |
| 18 | Ar:N$_2$ 50:50 | 2.5 | 408 | 278 | 21 | 0 | N.C. | N.C. | — | non-selective |
| 19 | Ar:N$_2$ 50:50 | 5.0 | 598 | 321 | 12.8 | 4.0 | 1.97 | 0.04 | 49 | low capacity, time to min. shorter vs. pure N$_2$ |

*Treatment of 5A - CMS (CST-51) with 1,2,4-TMC at 675° C., space velocity = 1.0/min.
**N.C. = not calculated

EXAMPLES 20-43

In Table 2, data are summarized for another sequence of runs which were made using a different, smaller furnace (producing 15 grams versus 250 grams of CMS), without rotating the sorbent in the furnace, and using a vaporizer instead of an LC pump for the TMC addition producing a different amount of volatile hydrocarbon in the diluent gas.

Example 31 is representative of the procedure used to modify 15 grams of CMS. Using a TMC coked CST5A material in a 200 cc sized quartz tube within a Lindbergh furnace, house nitrogen was fed into the reactor (107 cc's per minute nitrogen) with about 107 cc's of helium. The reactor was heated to 675° C. at about 10° C. per minute and held at 675° C. for ten minutes and then the gas mixture was redirected through a heated reservoir of TMC at 75° to 85° C. and this TMC was added to the reactor over 4 hours. The treating gas (TMC plus diluent) had a hydrocarbon concentration of less than 20 vol. %. Then the gas mixture was redirected to avoid the TMC and to cool the furnace.

Data of Examples 20, 24, 28 and 31 are also plotted and shown in FIG. 1, where the difference produced by the diluent gases can be discerned more dramatically. FIG. 1 is a CAU plot which illustrates the change in oxygen concentration over the CMS as a function of time. The coking time in each case was 4 hours while the temperature of 675° C. and the ramp rate of 10° C. per minute were maintained constant. The use of nitrogen as the diluent gas produced a slow, pore blocked adsorbent (Ex. 20). The use of helium produced a faster CMS as demonstrated by the drop of percent oxygen from 21% to the minimum in the curve and the rate of return to the final oxygen level (Ex. 24). The use of 50% helium in a mixture with nitrogen produced a fast CMS (Ex. 31), apparently as good as or better than the use of pure helium alone in this set of conditions. A mixture of 28% helium and nitrogen (Ex. 28) produced a CMS similar to the one obtained with helium as the carrier gas.

Referring to the data in Table 2, the CMS adsorbents of Examples 24 and 25 using helium were clearly superior to those of Examples 20 and 21 which used nitrogen as the diluent gas. Example 27 using a mixture of 13% helium in nitrogen produced a selective product but it was severely pore blocked. Examples 28, 29, 30, 31 and 32 however, all demonstrate helium-nitrogen blends ranging from 28% helium to 50% helium, which produced CMS adsorbents having good selectivity and capacity. The CMS of Example 34 using diluent gas containing 72% helium in nitrogen was somewhat slower, but still had good selectivity.

Example 35 using pure argon as the diluent gas and a treating time of 4 hours produced a sieve which was pore blocked. As shown, however, by Example 42, reducing the hold tiem to 1.5 hours enables a selective adsorbent to be prepared using argon as the diluting gas. Mixtures of argon with nitrogen as shown by Examples 37 and 38 produced CMS products which were selective in their separation but the product of Example 37 was severely pore blocked and the product of Example 38 was slow and pore blocked. At a shorter exposure time (Example 39) a 50/50 blend of argon/nitrogen offered no advantage over similar treatments with the pure gases (Examples 23 and 42).

It is apparent that a mixture of nitrogen and argon does not have the same beneficial effect as a mixture of nitrogen and helium as the diluent gas in treating a CMS with a hydrocarbon gas at pyrolysis temperatures.

TABLE 2

| Example No. | Treating:* Diluent Gas | Time at Temp. (hr) | Testing: (CAU) Initial Pressure (torr) | Final Pressure (torr) | Minimum % O₂ | Time to Minimum (min.) | L | m | Selectivity L/m | Comments |
|---|---|---|---|---|---|---|---|---|---|---|
| 20 | $N_2$ | 4 | 604 | 398 | 13.3 | 5.4 | 1.06 | 0.003 | 350 | severely pore-blocked |
| 21 | $N_2$ | 4 | | 317 | 12.6 | 2.3 | 2.07 | 0.04 | 52 | lacked cap., pore-blocked |
| 22 | $N_2$ | 3 | | 491 | 14.2 | 26[a] | [b] | [b] | — | pore-blocked |
| 23 | $N_2$ | 1.5 | | 288 | 13.8 | 0.3 | 11.8 | 0.46 | 26 | selective |
| 24 | He | 4 | 601 | 299 | 12.3 | 0.7 | 6.51 | 0.12 | 54 | good rates, sel. & cap. |
| 25 | He | 4 | 598 | 286 | 12.6 | 0.7 | 6.72 | 0.14 | 48 | good rates, sel. & cap. |
| 26 | He | 1.5 | | | | | | | | non-selective, fast |
| 27 | He:$N_2$ 13:87 | 4 | | 469 | 12.7 | 58.9 | [b] | [b] | — | severely pore blocked |
| 28 | He:$N_2$ 28:72 | 4 | 601 | 287 | 12.7 | 1.1 | 4.07 | 0.10 | 41 | good sel., rates somewhat slow |
| 29 | He:$N_2$ 28:72 | 4 | | 279 | 12.6 | 0.5 | 9.03 | 0.22 | 41 | good sel., rates & cap. |
| 30 | He:$N_2$ 37:63 | 4 | | 309 | 12.8 | 1.5 | 3.42 | 0.05 | 68 | good sel., rates somewhat slow |
| 31 | He:$N_2$ 50:50 | 4 | 595 | 285 | 12.5 | 0.6 | 7.39 | 0.23 | 32 | good sel., rates & cap. |
| 32 | He:$N_2$ 50:50 | 4 | | 300 | 12.2 | 1.2 | 3.83 | 0.09 | 43 | good sel., rates somewhat slow |
| 33 | He:$N_2$ 50:50 | 1.5 | | 281 | 15.6 | 0.3 | 8.18 | 1.49 | 5 | fast, slightly sel., good capacity |
| 34 | He:$N_2$ 72:28 | 4 | | 301 | 14.6 | 1.3 | 3.44 | 0.08 | 43 | slower, good selectivity |
| 35 | Ar | 4 | | 453 | 14.5 | 58.5[a] | [b] | [b] | — | pore blocked |
| 36 | Ar | 4 | | 415 | 12.6 | 9.6[a] | [b] | [b] | — | pore blocked |
| 37 | Ar:$N_2$ 50:50 | 4 | | 458 | 13.5 | 58.9[a] | [b] | [b] | — | severely, pore blocked |
| 38 | Ar:$N_2$ 25:75 | 4 | | 368 | 12.7 | 3.7 | 1.30 | 0.023 | 57 | slow, pore blocked |
| 39 | Ar:$N_2$ 50:50 | 1.5 | | 292 | 14.3 | 0.4 | 8.57 | 0.37 | 23 | good rates, good selectivity |
| 40 | Ar | 4 | | 541 | 18.3 | 59[a] | [b] | [b] | — | pore blocked |
| 41 | Ar | 2 | | 377 | 14.1 | 0.2 | [b] | [b] | — | low capacity, slow, pore blocked |
| 42 | Ar | 1.5 | | 275 | 13.6 | 0.3 | 10.9 | 0.48 | 23 | selective |
| 43 | Ar | 1.0 | | 286 | — | — | — | — | — | non-selective, fast |

*Treatment of 5A-CMS (CST-50) with 1,3,5-TMC at 675° C.
[a]In this series of examples, when the time to minimum percent oxygen is greater than 2 minutes, the L and m values became meaningless due to a poor fit of the data to Equation 4. In many cases this is caused by the sieve material so kinetically slow (due to extensive but not necessarily complete pore blockage) that it is difficult to desorb the oxygen from the sorbent, thereby making it unsuitable for air separation.
[b]Fit not performed or gave suspect values since equilibrium was not achieved in one hour.

We have found that the identity of the diluent gas also has a significant effect upon the oxidative treatment of carbon molecular sieves with carbon dioxide at elevated temperatures. Such oxidative treatment is used to widen pores and open porosity of CMS so that it will sorb both oxygen and nitrogen rapidly, thereby making a carbon precursor useful as a starting material for hydrocarbon pyrolysis and carbon deposition to narrow pore openings in a controlled manner. The following example illustrates the advantageous use of different carrier gases in such an oxidative pretreatment.

EXAMPLE 44

In another series of runs, it was demonstrated that the identity of the diluent gas also has an effect upon the oxidation of slow, unmodified CMS precursors by carbon dioxide. Carbon dioxide is known to create additional porosity in CMS material by the following reaction:

$$C + CO_2 \rightarrow 2CO$$

Carbon dioxide was used to widen existing pores and open up new porosity in the carbon sieves. The result was a carbon adsorbent which was faster in rate for both oxygen and nitrogen adsorption. Diluent gases for the $CO_2$ were used as follows:

Run A—25% $CO_2$, 75% $N_2$
Run B—25% $CO_2$, 75% Ar
Run C—25% $CO_2$, 25% Ar, 50% $N_2$
Run D—25% $CO_2$, 75% He

Figure 2:
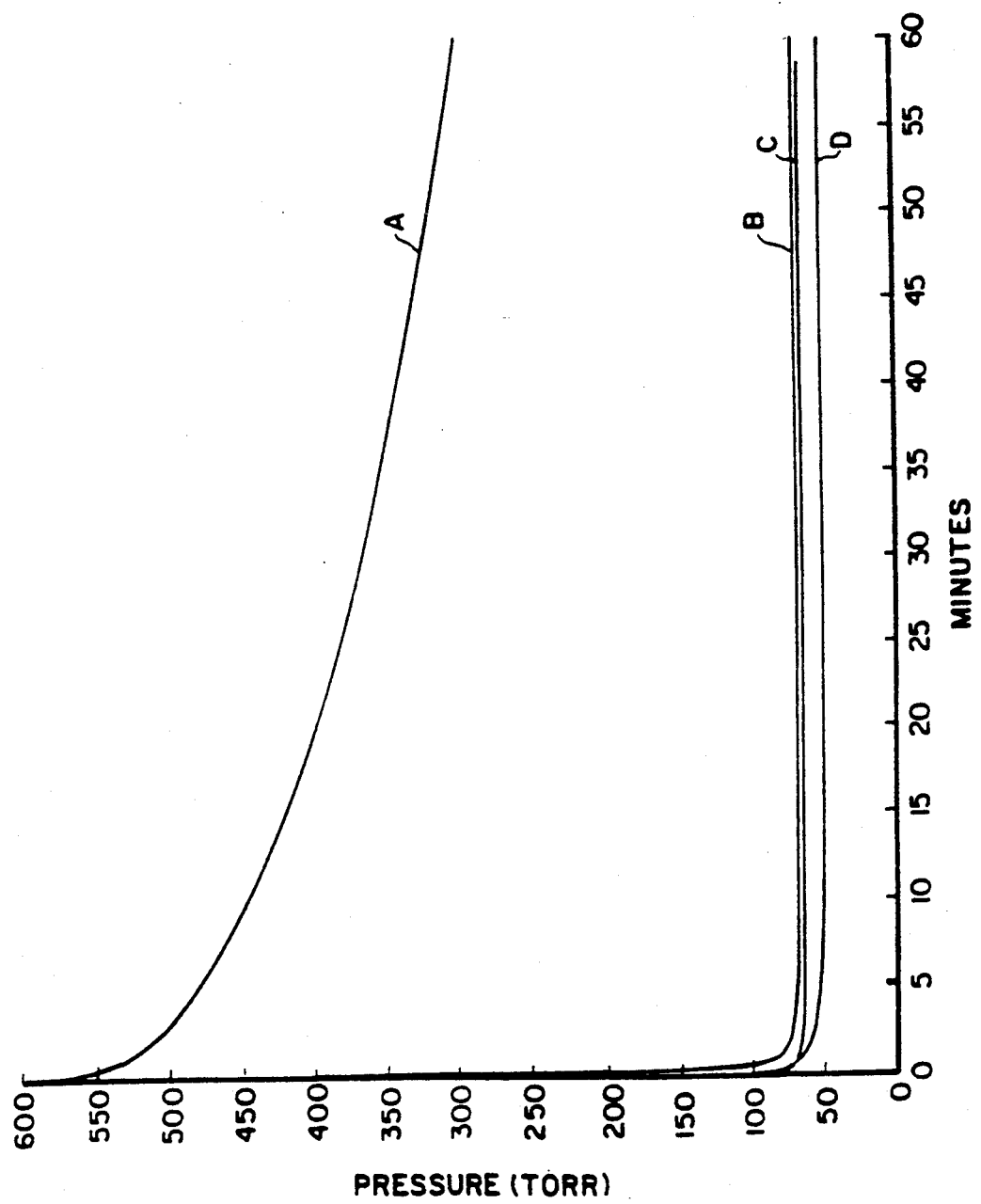
FIG. 2 is a plot over time of pressure above carbon molecular sieve treated with carbon dioxide and various diluent gases.

All percentages are by volume.
The results are presented by the data which are plotted in FIG. 2, showing plots of pressure drop against time for nitrogen sorption by the adsorbents of Runs A-D. Nitrogen was chosen as the model adsorbate since changes in its absorption rate are easily detected. Using a mixture of nitrogen and 25% carbon dioxide (Run A), the resulting adsorbent was quite slow in reaching an equilibrium value. On the other hand, the use of 25% carbon dioxide with argon (Run B), helium (Run D), or a mixture of 25% argon in nitrogen (Run C), all produced fast, unselective carbons. All materials were treated for one hour at 800° C. with a ramp speed of 10° C. per minute and 25% carbon dioxide in the indicated diluent gases.

While it is not fully understood why such dramatic differences appear between gases which are normally thought to be inert, it is clear that helium and argon are superior to nitrogen as diluent gases in oxidative CMS modification and that helium is better than either nitrogen or argon in CMS pore narrowing by hydrocarbon pyrolysis. In principal, one would not expect that these gases (argon, helium or nitrogen) would control oxidation or carbon deposition and pore size which is based on a chemical reaction with the surface of the starting CMS material. While not to be bound by theory, it is believed that the effects may be related to size, shape and/or thermal conductivity of the carrier gases. The pores need to be wide enough to allow reasonable transport rates for oxygen and nitrogen in the pore channels. Pores of about 4 angstroms with pore mouth diameters of about 3.8 angstroms are effective for kinetic separation of air in the CMS adsorbents. The molecular dimensions of the gases and/or the monatomic versus diatomic nature of the helium and argon versus nitrogen, may influence the location within the pore where cracking occurs. Alternatively, the higher thermal conductivity of helium may be important in transferring heat into or out of the sorbent as pore size is being developed or controlled. Table 3 summarizes the kinetic diameters and thermal conductivity of the gases used.

TABLE 3

| Gas | Kinetic Diameter[a] Angstroms | Thermal Conductivity[b] at 100° C. $10^{-5}$ cal/sec-cm$^2$/(°C./cm) |
|---|---|---|
| He | 2.6 | 41.6 |
| Ar | 3.4 | 5.2 |
| $O_2$ | 3.46 | 7.6 |
| $N_2$ | 3.64 | 7.5 |
| $CO_2$ | 3.3 | 5.3 |

[a]From Lennard-Jones(6–12), o value; D. W. Breck, "Zeolite Molecular Sieves", Wiley-Interscience, New York, NY, 1974, p636.
[b]A. J. Gordon and R. A. Ford, "The Chemists Comparison", Wiley-Interscience, New York, NY, 1972, p. 394.

Whatever the reason for the results, the effect, particularly with the mixture of nitrogen and helium showing some synergistic character, is remarkable and unpredictable.

Other advantages and embodiments of our invention will be apparent to those skilled in the art from the foregoing disclosure without departing from the spirit or scope of our invention.

We claim:

1. A process for modifying a carbon molecular sieve in order to alter its gas separation characteristics which comprises contacting said sieve under pyrolysis conditions with a volatile carbon-containing organic compound in a gaseous state admixed with diluent gas comprising helium for a time sufficient to affect said characteristics.

2. The process of claim 1 wherein said sieve is modified by narrowing the openings of its micropores.

3. The process of claim 2 wherein said diluent gas is a mixture of helium and nitrogen.

4. The process of claim 3 wherein said diluent gas contains at least about 15 volume percent helium.

5. The process of claim 3 wherein said diluent gas contains at least about 25 volume percent helium.

6. The process of claim 2 wherein said contacting is carried out at a temperature and for a time sufficient to increase the selectivity and capacity of said sieve for the separation of oxygen from nitrogen.

7. The process of claim 6 wherein said carbon molecular sieve before modification is characterized by micropores of about 4.5 to 8 angstroms.

8. The process of claim 7 wherein said diluent gas is a mixture containing nitrogen and at least about 15 volume percent helium.

9. A process for modifying a carbon molecular sieve by oxidative treatment with carbon dioxide which comprises contacting said sieve at elevated temperature with carbon dioxide admixed with a diluent gas comprising helium or argon for a time sufficient to widen and open pores in said sieve available to contacting gases.

10. The process of claim 9 wherein said diluent gas is a mixture of argon and nitrogen.

* * * * *